US 011458497B2

(12) United States Patent
Park et al.

(10) Patent No.: US 11,458,497 B2
(45) Date of Patent: Oct. 4, 2022

(54) COAXIAL CONTROL DUAL NOZZLE

(71) Applicant: Jong-Su Park, Seoul (KR)

(72) Inventors: Jong-Su Park, Seoul (KR); Woong Huh, Incheon (KR); Youn-Chang Lee, Seoul (KR); Woong-June Hwang, Incheon (KR)

(73) Assignee: Jong-Su Park, Seoul (KR)

( * ) Notice: Subject to any disclaimer, the term of this patent is extended or adjusted under 35 U.S.C. 154(b) by 322 days.

(21) Appl. No.: 16/772,436

(22) PCT Filed: Dec. 11, 2018

(86) PCT No.: PCT/KR2018/015716
§ 371 (c)(1),
(2) Date: Jun. 12, 2020

(87) PCT Pub. No.: WO2019/117603
PCT Pub. Date: Jun. 20, 2019

(65) Prior Publication Data
US 2021/0069741 A1 Mar. 11, 2021

(30) Foreign Application Priority Data

Dec. 12, 2017 (KR) .................. 10-2017-0170154

(51) Int. Cl.
| | | |
|---|---|---|
| *B05B 13/02* | (2006.01) | |
| *B05B 1/30* | (2006.01) | |
| *B05B 7/06* | (2006.01) | |
| *B05B 1/06* | (2006.01) | |
| *B05B 1/02* | (2006.01) | |
| *B05B 5/035* | (2006.01) | |

(52) U.S. Cl.
CPC ............ *B05B 13/0278* (2013.01); *B05B 1/02* (2013.01); *B05B 1/06* (2013.01); *B05B 1/306* (2013.01);
(Continued)

(58) Field of Classification Search
CPC ......... B05B 13/0278; B05B 1/02; B05B 1/06; B05B 1/3046; B05B 1/306; B05B 7/066; B05B 5/035
(Continued)

(56) References Cited

U.S. PATENT DOCUMENTS 3,066,874 A * 12/1962 Becker ................. B05B 7/1263
 239/424
7,051,954 B2 * 5/2006 Gerstner ............... B05B 7/0815
 239/296
(Continued)

FOREIGN PATENT DOCUMENTS

CN 202410631 U 9/2012
CN 103911678 A 7/2014
(Continued)

OTHER PUBLICATIONS

Qing Gao, et al.; "Coaxial nozzle-assisted 3D bioprinting with built-in microchannels for nutrients delivery" Biomaterials 61 (2015) p. 203-215.

*Primary Examiner* — Steven J Ganey
(74) *Attorney, Agent, or Firm* — Wolter Van Dyke Davis, PLLC; Eugene J. Molinelli

(57) ABSTRACT

Disclosed is a coaxial control dual nozzle, which includes an inner nozzle body having an injection port through which a first fluid is injected; an inner needle connected to the inner nozzle body and having a hollow tube needle configured to provide a discharge port for the first fluid; an outer nozzle body assembled with the inner nozzle body and having an injection port through which a second fluid is injected; an outer needle connected to the outer nozzle body and disposed to surround the hollow tube needle provided to the inner needle, the outer needle having a hollow tube needle configured to provide a discharge port for the second fluid; an inner needle positioning unit configured to control a
(Continued)

location of a central axis of the hollow tube needle provided to the inner needle; and an outer needle positioning unit configured to control a location of a central axis of the hollow tube needle provided to the outer needle.

14 Claims, 5 Drawing Sheets

(52) U.S. Cl.
CPC ............ B05B 1/3046 (2013.01); B05B 7/066 (2013.01); B05B 5/035 (2013.01)

(58) Field of Classification Search
USPC .... 239/296, 398, 422, 423, 424, 428, 533.1, 239/600
See application file for complete search history.

(56) References Cited

U.S. PATENT DOCUMENTS

| | | |
|---|---|---|
| 9,772,301 B2 | 9/2017 | Kim et al. |
| 9,796,183 B2 | 10/2017 | Huang |
| 2005/0095365 A1* | 5/2005 | Acum ................ B05C 5/0225 118/323 |
| 2007/0199824 A1 | 8/2007 | Hoerr et al. |
| 2007/0262173 A1* | 11/2007 | Percival ............. B05B 7/0815 239/423 |
| 2009/0121167 A1* | 5/2009 | O'Brien ............. B05B 7/0475 251/65 |

FOREIGN PATENT DOCUMENTS

| | | |
|---|---|---|
| JP | S60-144951 U | 9/1985 |
| JP | 2000202326 A | 7/2000 |
| JP | 2002-273276 A | 9/2002 |
| JP | 2010194417 A | 9/2010 |
| JP | 2015-203710 A | 11/2015 |
| JP | 2018-000559 A | 1/2018 |
| KR | 20040080031 A | 9/2004 |
| KR | 20050112044 A | 11/2005 |
| KR | 200431592 Y1 | 11/2006 |
| KR | 100919772 B1 | 10/2009 |
| KR | 100957840 B1 | 5/2010 |
| KR | 20110020438 A | 3/2011 |

* cited by examiner

COAXIAL CONTROL DUAL NOZZLE

TECHNICAL FIELD

The present application claims priority to Korean Patent Application No. 10-2017-0170154 filed on Dec. 12, 2017 in the Republic of Korea, the disclosures of which are incorporated herein by reference.

The present disclosure relates to a coaxial control dual nozzle, and more particularly, to a coaxial control dual nozzle in which a capillary hollow tube needle is configured into a dual tube as a discharge port of an electrospinning device.

BACKGROUND ART

In general, a coaxial dual nozzle having an inner nozzle and an outer nozzle is used for discharging a solution through a discharge port of the inner nozzle, discharging air or gas through a discharge port at the outside to granulate the solution, or coating a granulated spray solution on a specific substrate.

In addition, the dual nozzle having a hollow tube is used to manufacture hollow nanofibers or core-shell structured microfibers through an electrospinning process, or to manufacture particles of a double layer structure through an electro-spraying process.

U.S. Pat. Nos. 9,772,301 and 9,796,183 introduce microprocesses for producing or coating a particulate or fibrous structure of a nanometer (nm) to micrometer (μm) size with a fluid discharge rate of 100 microliters (μl) or less per minute. A hollow tube needle used in the above microprocess has a small diameter of 0.01 mm to 1 mm, and a space between an inner needle and an outer needle of the dual tube needle having a concentric structure is small less than 0.1 mm Thus, precise work is required when constructing the double tube coaxially.

However, if the gap between the hollow tube needles is 0.1 mm or less, the inner needle is not configured coaxially by contacting the outer needle or the like, and is mostly distorted non-coaxially.

In addition, if the inner needle is replaced since the inner needle is blocked, the central axis of the hollow tube needle may not be maintained as it is. Unlike the coaxial dual nozzle described above, if a core-shell structure or particles are prepared, as in Korean Patent No. 10-0919772, it is needed to control the central axis of the hollow tube needle provided to an inner nozzle unit and an outer nozzle unit non-coaxially according to the properties of the solution. However, the conventional dual nozzle has a disadvantage that it is difficult to precisely control the inner needle and the outer needle non-coaxially.

DISCLOSURE

Technical Problem

The present disclosure is designed to solve the problems of the related art, and therefore the present disclosure is directed to providing a coaxial control dual nozzle having a structure capable of controlling a central axis of a hollow tube needle.

The present disclosure is also directed to providing a coaxial control dual nozzle, which may precisely adjust the central axes of the inner needle and the outer needle coaxially or non-coaxially.

The present disclosure is further directed to providing a coaxial control dual nozzle, which may facilitate the replacement of the hollow tube needle and maintain the central axis of the hollow tube needle after replacement.

Technical Solution

In one aspect of the present disclosure, there is provided a coaxial control dual nozzle, comprising: an inner nozzle body having an injection port through which a first fluid is injected; an inner needle connected to the inner nozzle body and having a hollow tube needle configured to provide a discharge port for the first fluid; an outer nozzle body assembled with the inner nozzle body and having an injection port through which a second fluid is injected; an outer needle connected to the outer nozzle body and disposed to surround the hollow tube needle provided to the inner needle, the outer needle having a hollow tube needle configured to provide a discharge port for the second fluid; an inner needle positioning unit configured to control a location of a central axis of the hollow tube needle provided to the inner needle; and an outer needle positioning unit configured to control a location of a central axis of the hollow tube needle provided to the outer needle.

The inner needle positioning unit may have a metal plate in which a central hole into which the inner needle is inserted and a plurality of peripheral holes through which the second fluid injected into the outer nozzle passes are formed.

The metal plate may be placed on a holder installed inside the outer nozzle body.

The outer needle positioning unit may have at least one central axis adjusting screw pin disposed around the outer needle.

The screw pin may have a diameter of 0.5 mm to 5 mm, and a tip of the screw pin may have a sharp shape or a U shape to make contact with the hollow tube needle.

The coaxial control dual nozzle may further comprise an inner needle fastening cap configured to attach and detach the inner needle to/from the inner nozzle body, and the inner needle fastening cap may have a semicircular groove structure configured to be fastened to a hub provided to the inner needle or a Luer lock structure having a double screw thread formed therein.

The hollow tube needle provided to the inner nozzle and the outer nozzle may have an inner diameter of 0.005 mm to 2 mm, an outer diameter of 0.02 mm to 3 mm, and a length of 2 mm to 200 mm.

A high voltage applying unit configured to apply a DC high voltage of 0.1 kV to 60 kV may be connected to the inner nozzle body.

A gap between an outer diameter of the hollow tube of the inner needle and an inner diameter of the hollow tube of the outer needle may be 5 μm to 1,000 μm.

In another aspect of the present disclosure, there is also provided a coaxial control dual nozzle, comprising: an inner nozzle body having an injection port through which a first fluid is injected; an inner needle connected to the inner nozzle body and having a hollow tube needle configured to provide a discharge port for the first fluid; an outer nozzle body assembled with one end of the inner nozzle body and having an injection port through which a second fluid is injected; an outer needle connected to the outer nozzle body and disposed to surround the hollow tube needle provided to the inner needle, the outer needle having a hollow tube needle configured to provide a discharge port for the second fluid; an inner needle positioning unit configured to control a location of a central axis of the hollow tube needle provided to the inner needle; an outer needle positioning unit configured to control a location of a central axis of the hollow tube needle provided to the outer needle; a pneumatic controller body assembled with the other end of the inner nozzle body and having an injection port through which air is injected; and a needle shaft installed inside the pneumatic controller body and operated by the air to control or block the flow of a solution transported to the inner needle.

The needle shaft may include a taper blocking unit configured to block the injection port of the inner needle and a front tip needle configured to be inserted into the hollow tube needle of the inner needle.

The needle shaft may be elastically biased upward by a spring to keep the inner needle in an opened state at ordinary times.

When air is injected into the pneumatic controller body, the taper blocking unit of the needle shaft may block the injection port of the inner needle, and the front tip needle may be inserted into the hollow tube needle of the inner needle so that an end portion thereof protrudes out of the tip.

The coaxial control dual nozzle may further comprise a needle shaft sealing unit coupled to the needle shaft inside the inner nozzle body to prevent the first fluid from leaking above the inner needle.

Advantageous Effects

The coaxial control dual nozzle according to present disclosure gives the following effects.

First, since the central axes of the inner needle and the outer needle are precisely controlled coaxially, it is possible to manufacture a particulate and fibrous filament structure having a uniform core-shell dual structure.

Second, since a coaxial or non-coaxial dual nozzle is provided by freely adjusting the central axis of the hollow tube needle, it is possible to manufacture various core-shell structures in which the fluid discharged from the inner needle serves as a shell.

Third, the hollow tube needle having a very small diameter may be easily replaced, and the coaxial axis of the dual nozzle may be precisely maintained even after replacement.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
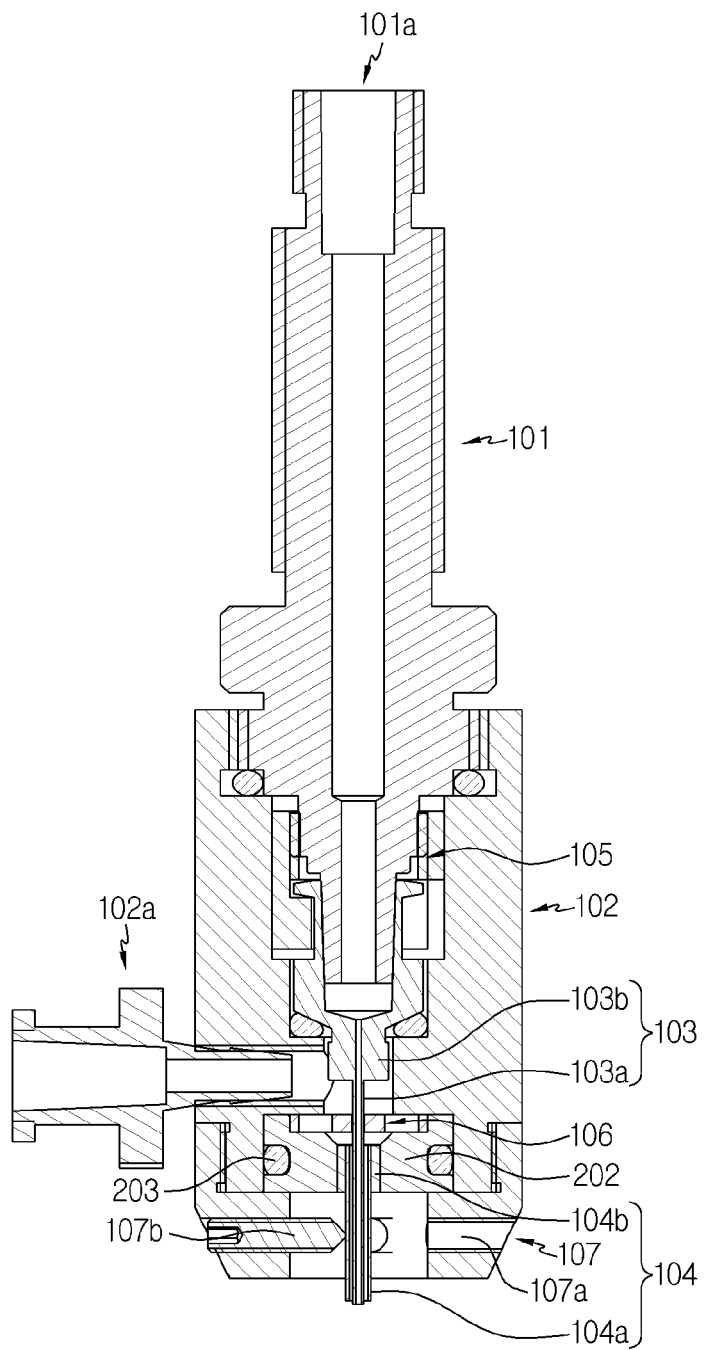
FIG. 1 is a cross-sectioned view showing a coaxial control dual nozzle according to an embodiment of the present disclosure.

FIG. 1 is a cross-sectioned view showing a coaxial control dual nozzle according to an embodiment of the present disclosure.

Referring to FIG. 1, the coaxial control dual nozzle according to an embodiment of the present disclosure includes an inner nozzle body 101 into which a first fluid is injected, an outer nozzle body 102 into which a second fluid is injected, an inner needle 103 having a hollow tube needle to serve as a discharge port for the first fluid, an inner needle fastening cap 105 provided to easily attach and detach the inner needle 103 to/from the inner nozzle body 101, and an outer needle 104 having a hollow tube needle to serve as a discharge port for the second fluid, an inner needle positioning unit 106 for controlling a location of a central axis of the hollow tube needle provided to the inner needle 103, and an outer needle positioning unit 107 for controlling a location of a central axis of the hollow tube needle provided to the outer needle.

The inner nozzle body 101 has an injection port 101a into which the first fluid in a gas or liquid state is injected, a solution storage space, and an outlet having a tapered shape. The injection port 101a of the inner nozzle body 101 is configured using a two-threaded component, and a syringe or a male fitting having an outlet of a Luer lock structure is coupled thereto or a fitting for tubing fastening is coupled thereto. The outlet of the inner nozzle body 101 has a Luer taper shape so as to come into close contact with a socket portion of a needle and be closely coupled thereto. In addition, the solution storage space of the inner nozzle body 101 is configured as a flow path through which the solution is transferred or a space in which the solution may be stored. In addition, a thread is formed on an outer surface of the inner nozzle body 101 so as to be coupled to a predetermined fixing (not shown) corresponding thereto.

The Luer taper connection standard applies to ISO 594 standards {ISO 594-1: 1986 "Conical fittings with a 6% (Luer) taper for syringes, needles and certain other medical equipment" [1] (https://www.iso.org/standard/4693.html}. The material of the inner nozzle body 101 is preferably an electrically conductive metal such as stainless steel (SUS), copper-based materials plated with aluminum, nickel or chromium, brass plated with nickel or chromium, or the like. In the case of a biopolymer solution containing cells, a non-metallic material such as a fluorine-based polymer like Teflon, PEEK (polyetheretherketone), cemented carbide, or quartz may be used depending on the type of solution.

A DC high voltage of, for example, 0.1 kV to 60 kV may be applied to the inner nozzle body 101 by a high voltage applying unit (not shown). If a high voltage is applied, the solution discharged to the nozzle tip has a charge.

The outer nozzle body 102 has an injection port 102a through which a second fluid in a gas state is injected, a placing space for the inner needle 103, and a placing space for the outer needle 104.

The injection port 102a provided to the outer nozzle body 102 is configured such that a female fitting or a fitting for tubing fastening is coupled to a side surface thereof. The female fitting material is preferably made of an insulating material that is not affected by an electric field when a high voltage is applied. The outer nozzle body 102 is made of the same material as the inner nozzle body 101. That is, an electrically conductive metal such as stainless steel (SUS), copper-based materials plated with aluminum, nickel or chromium, brass plated with nickel or chromium, or the like, and a non-metallic material such as a fluorine-based polymer like Teflon, PEEK (polyetheretherketone), cemented carbide, or quartz may be used. The gas supplied to the outer nozzle body preferably has a pressure of 1 to 7 kg/cm$^2$ (bar).

The inner needle 103 coupled to the inner nozzle body 101 includes a hollow tube needle 103a and a connection member 103b having a hub (socket) or a sleeve connected to one tip (top) of the hollow tube needle 103a.

The outer needle 104 coupled to the outer nozzle body 102 includes a hollow tube needle 104a and a connection member 104b having a hub (socket) or sleeve connected to one tip (top) of the hollow tube needle 104a.

The sleeve, which may be adopted as the connection members 103b, 104b, has a hollow tube type or is configured using a hollow screw having a thread thereon. If the sleeve is made of a polymer with softness and elasticity, the hollow tube needle connected thereto may be easily replaced. The sleeve is a hollow tube made of soft material such as fluorinated ethylene propylene (FEP), perfluoroalkoxy alkane (PFA) and polytetrafluoroethylene (PTFE). In addition, a hollow tube made of a conductive polymer material containing carbon and metallic substances may be provided in order to impart conductivity between the hollow needle and the nozzle body. The hollow tube preferably has an inner diameter equal to or smaller than an outer diameter of the hollow tube so that the hollow tube is excellently adhered. The hollow tube preferably has an inner diameter of 0.05 to 4 mm and an outer diameter of 1 to 5 mm. In addition, the hollow tube may be made of copper-based material or a non-metal material containing copper. Preferably, a non-ferrous metal-based containing brass, nickel-plated brass, copper or the like, an aluminum-based material, a SUS metal-based material, or a moldable polymer-based material such as PEEK may be used.

Since the inner needle 103 is frequently blocked during the discharge of the solution due to a relatively small inner diameter of the hollow tube needle 103a, a hub that is easily attached and detached is preferably used as the connection member 103b.

Since the hollow tube needle 104a of the outer needle 104 has a relatively great diameter, it is preferable that the metal sleeve is employed as the connection member 104b or the hollow tube needle 104a is assembled by press fitting without a sleeve. The hollow tube needles 103a, 104a used for the inner needle 103 and the outer needle 104 preferably have an inner diameter of 0.005 mm to 2 mm, an outer diameter 0.02 mm to 3 mm, and a length of 2 mm to 200 mm. The hollow tube needle is preferably made of stainless steel (SUS), silica, quartz-based material, cement-based material, fluorine or PEEK-coated SUS.

The tip of the hollow tube needles 103a, 104a has a blunt end shape or a pointed end shape. At this time, depending on the corner angle, the blunt end may be an angled tip angled at 90 degrees, a chamfered tip with a rounded corner, or a tapered tip that becomes thinner toward the tip. The preferred shape of the tip is a blunt end with a rounded corner, a tapered shape, or a pointed shape.

The inner needle 103 is coupled to the inner nozzle body 101 by an inner needle fastening cap 105. The inner needle fastening cap 105 is configured with a semicircular groove structure in which the hub of the inner needle 103 is placed, or a Luer lock structure. In the case where the cap has a semicircular groove structure in which the hub is placed, if the inner needle 103 is placed in the groove of the cap and then the cap is turned, the socket part of the hub is pushed up to the top of the taper and is coupled in contact with the top. Meanwhile, in the case where the cap having a Luer lock structure with a double screw thread formed therein is installed, if the hub of the needle is turned, the hub is pushed up to the top of the tapered portion and coupled thereto. The fastening cap 105, which is easy to detach the inner needle 103, is a cap having a groove structure in which the hub is placed.

Figure 2:
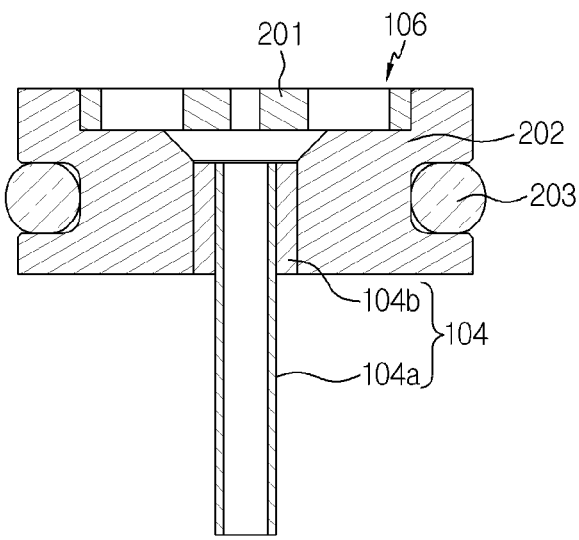
FIG. 2 is a cross-sectioned view showing an inner needle positioning unit of FIG. 1.
Figure 3:
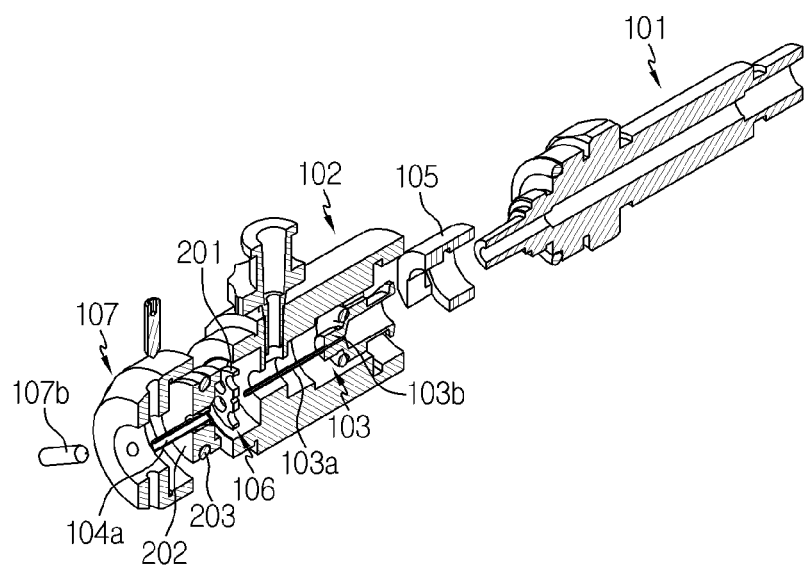
FIG. 3 is a sectioned perspective view of FIG. 1.
Figure 4:
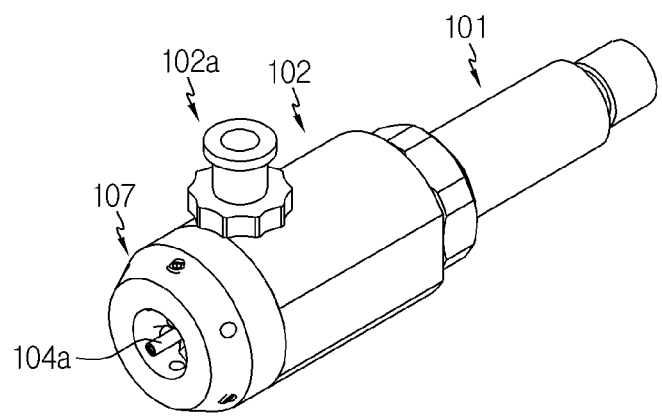
FIG. 4 is a perspective view of FIG. 1.

The inner needle positioning unit 106 includes a metal plate 201 (see FIG. 2) in which a central hole into which the inner needle 103a is inserted and a plurality of peripheral holes through which the fluid injected into the outer nozzle body 102 may pass are formed. The central hole has a diameter greater than that of the metal plate 201 by 0.001 mm to 0.5 mm so that the inner needle 103a passes therethrough. Preferably, the preferred diameter of the central hole is greater than the diameter of the inner needle 103a by 0.001 mm to 0.1 mm, so that there is almost no gap therebetween. An inlet of the central hole is preferably chamfered to facilitate the passage of the needle. The metal plate 201 preferably has a thickness of 0.1 mm to 5 mm More preferably, the thickness of the metal plate 201 is 0.5 mm to 2 mm. The peripheral hole through which the fluid passes preferably has a size of 1 mm to 5 mm. The number of peripheral holes is preferably 3 to 6. The peripheral hole may have a circular or rectangular shape.

The metal plate 201 of the inner needle positioning unit 106 is installed to the holder 202 of the outer needle 104 or to the outer nozzle body 102. In order to concentrically align the central axes of the inner needle 103 and the outer needle 104, the metal plate 201 is preferably installed to the holder 202 of the outer needle 104 inside the outer nozzle body 102.

As an alternative, the inner needle positioning unit 106 may have screw pin holes at intervals of 60 to 120 degrees along the length of the inner needle 103 and the outer needle 104 of the dual nozzle, instead of the metal plate, and 1 to 3 screw pins may be used to adjust the central axis of the needle.

If the connection member 104b of the outer needle 104 is made as a sleeve, the sleeve is coupled to the holder 202 by press fitting. The metal plate 201 of the inner needle positioning unit 106 is disposed on the top of the holder 202. At this time, it is preferable to provide a space between the metal plate 201 and the outer needle 104a through which the fluid may move, in order to facilitate the flow of fluid. An O-ring 203 is installed at the circumferential surface of the holder 202 to prevent leakage of the solution or gas injected into the outer nozzle body 102. The O-ring 203 may be made of fluorine-based material, Viton, olefin-based material such as ethylene and propylene, or silicon-based material.

The holder 202 of the outer needle has a hole or female thread to which the sleeve 104b connected to the hollow tube needle 104a may be coupled. At this time, the diameter of the hole is preferably processed to be slightly smaller than the outer diameter of the sleeve 104b so as not to cause the pressurized leakage of the hollow tube needle 104a. Preferably, the inlet of the hole is slightly grooved (R-machined) to facilitate insertion of the sleeve 104b.

If a thread is formed on the outer circumferential surface of the sleeve 104b, it is preferable to form the thread using the thread standard of UNF (unified national fine), M2 to M5, preferably M3, so that no leakage occurs through the thread.

The outer needle positioning unit 107 includes at least one screw pin fastening portion 107a formed at regular intervals along the periphery (for example, at 60 degree intervals) and a central axis adjusting screw pin 107b fastened to the screw pin fastening portion 107a to adjust a location of the central axis of the outer needle 104. If a plurality of central axis adjusting screw pins 107b are provided, the plurality of central axis adjusting screw pins 107b may be arranged in a line around the cap of the positioning unit located at a bottom of the outer needle positioning unit 107, or may be arranged up and down at intervals. Preferably, one to three central axis adjusting screw pins 107b are arranged to adjust the central axis of the outer needle 104. The location of the central axis of the outer needle 104 is adjusted according to the location of the central axis of the inner needle 103. By adjusting the central axis of the outer needle 104, the inner needle 103 and the outer needle 104 may be aligned coaxially or non-coaxially. The diameter of the central axis adjusting screw pin 107b is preferably 0.5 mm to 5 mm, and the tip of the pin preferably has a pointed shape or a U shape to adjust the location of the central axis in contact with the outer needle 104. When the inner needle 103 and the outer needle 104 are coaxially arranged, the distance between the central axes is preferably adjusted to be within 0.1 mm.

The outer needle positioning unit 107 preferably has an outer diameter of 5 mm to 50 mm and an inner diameter of 2 mm to 46 mm, and a lower end of the outer needle positioning unit 107 is preferably located higher than a lower end of the outer needle tip by 1 mm to 5 mm. The inner needle positioning unit 106 and the outer needle positioning unit 107 may be made of any one of SUS metal, aluminum, brass, PEEK, acetal, and nylon. If the outer needle positioning unit 107 is made of an electrically conductive metal material, the solution discharged from the discharge port by applying a high voltage achieves radiation stability at the nozzle tip due to the electric field effect of the outer needle positioning unit 107.

The coaxial control dual nozzle having the above configuration is assembled as follows.

First, the connection member 103b of the inner needle 103 serving as a hub is connected to the inner needle fastening cap 105 to prepare a first coupling body, and the inner needle fastening cap 105 of the first coupling body is fastened to the inner nozzle body 101 to configure a second coupling body in which the inner needle 103 is coupled to the inner nozzle body 101.

Subsequently, the second coupling body is coupled to the outer nozzle body 102 to configure a third coupling body. In addition, the outer needle 104 and the metal plate 201 are coupled to the holder 202 to prepare a fourth coupling body, and then the fourth coupling body is coupled to the outer nozzle body 102 of the third coupling body to configure a fifth coupling body including a dual nozzle in which the inner needle 103 and the outer needle 104 are concentrically arranged. The locations of the central axes of the inner needle 103 and the outer needle 104 in the fifth coupling body are adjusted by, for example, three central axis adjusting screw pins 107b provided to the outer needle positioning unit 107.

Figure 5:
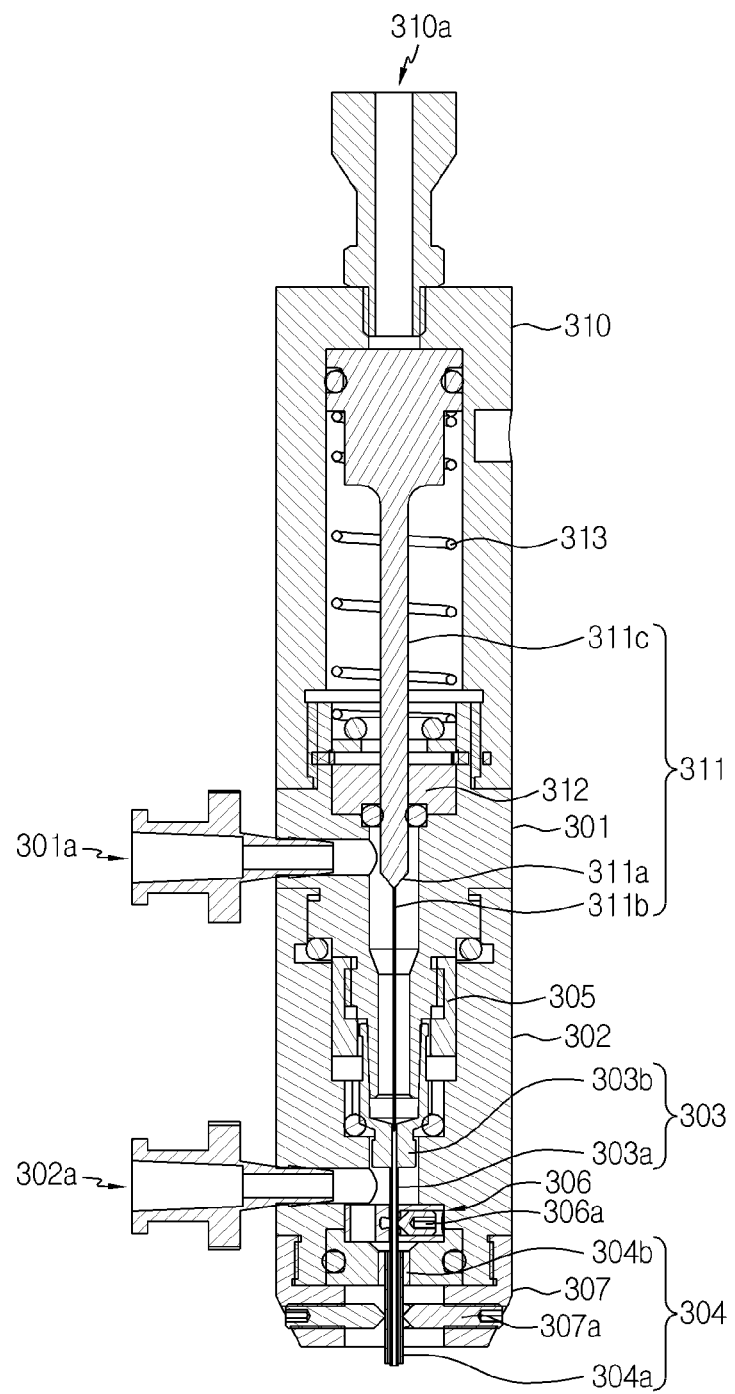
FIG. 5 is a cross-sectioned view showing a coaxial control dual nozzle according to another embodiment of the present disclosure.
Figure 6:
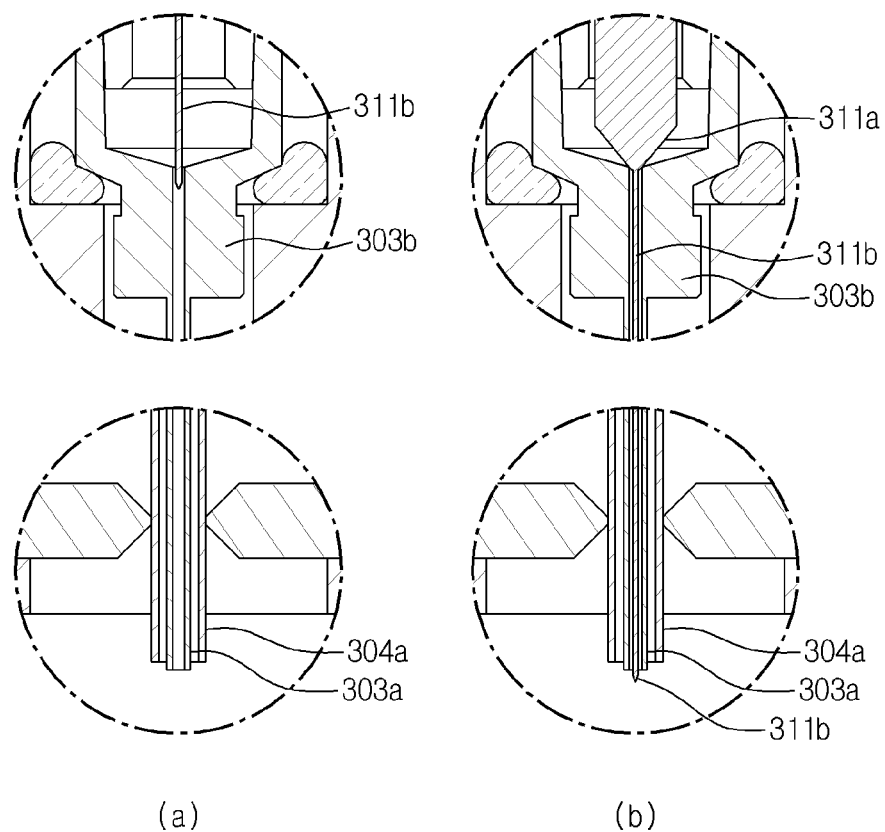
FIG. 6 is a cross-sectioned view showing an opened state (a) and a closed state (b) of a needle shaft of FIG. 5.

FIG. 5 is a cross-sectioned view showing a coaxial control dual nozzle according to another embodiment of the present disclosure.

As shown in FIG. 5, a coaxial control dual nozzle according to another embodiment of the present disclosure includes an inner nozzle body 301 having an injection port 301a into which a first fluid is injected, an outer nozzle body 302 having an injection port 302a into which a second fluid is injected, a pneumatic controller body 310 having an injection port 310a through which air is injected, a needle shaft 311 installed inside the dual nozzle to control or block the flow of a solution transported to the inner needle 303 during the process, a needle shaft sealing unit 312 having a lower end to which an O-ring is fastened to prevent the solution from leaking above the inner needle 303, an inner needle 303 having a hollow tube needle 303a serving as a discharge port of the fluid, and an inner needle fastening cap 305 configured using a Luer lock structure, an outer needle 304 having a hollow tube needle 304 serving as a discharge port of fluid or gas, an inner needle positioning unit 306 having a screw pin 306a for controlling the location of the central axis of hollow tube needle 303a of the inner needle 303, and an outer needle positioning unit 307 having a screw pin 307a for controlling the location of the central axis of the hollow tube needle 304a of the outer needle 304. Here, the components corresponding to the former embodiment have substantially the same configuration and operation and thus will not be described in detail again.

The needle shaft 311 is elastically biased upward by a spring 313 fastened to the shaft body 311c to maintain the lifted state. Accordingly, the inner needle 303 is in an opened state at ordinary times. The needle shaft 311 includes a taper blocking unit 311a configured to completely block an inlet of the inner needle 303 in order to block the flow of the solution, and a front tip needle 311b configured to extend forward from the taper blocking unit 311a and having a pointed end protruding toward the inner needle 303a. The front tip needle 311b has a diameter that may be inserted into the inner needle 303a.

The coaxial control dual nozzle including the needle shaft 311 configured as above is operated in the following process.

A solution is injected as the first fluid into the first injection port 301a, air is injected as the second fluid into the second injection port 302a, and the solution and the air are respectively discharged through the coaxial nozzle tip configured using a double tube. The injected solution is transferred to the inner needle 303, and the solution moving upward rather than toward the inner needle 303 is blocked by the sealing unit 312 disposed to be coupled to the needle shaft 311 inside the inner nozzle body 301. The air injected into the second injection port 302a finely granulates the solution discharged from the inner needle 303. When temporarily stopping the flow of the solution during the above injection process, if the air injection of the second injection port 302a is stopped and at the same time an external air is injected into the injection port 310a to operate the needle shaft 311 downward, the taper blocking unit 311a of the needle shaft 311 blocks the injection port of the inner needle 303. At the same time, the front tip needle 311b of the needle shaft 311 is inserted into the hollow tube needle 303a serving as a discharge port, so that a tip portion thereof protrudes out of the needle tip. Accordingly, the inner needle 303 comes into a closed state (see (b) of FIG. 5) and the flow of the solution is blocked.

In order to control the needle shaft 311, the air injected from the outside is injected with a pressure that overcomes the tension of the spring 313. If the injecting process is to be performed again, air injection to the pneumatic controller body 310 is blocked, and air is injected into the second injection port 302a. At this time, as the needle shaft 311 is returned to its original position by the operation of the spring 313, the inner needle 303 comes into an opened state (see (a) of FIG. 5), and the solution is injected and sprayed outside.

The dual nozzle including the needle shaft 311 is connected to a high voltage applying unit. By applying a DC high voltage of 0.5 kV to 50 kV to the dual nozzle, charge may be applied to the solution, thereby producing more uniform and fine particles.

The dual nozzle including the needle shaft 311 as described above may be used for an electrospinning process in which nanofibers are produced by injecting a first solution or a cleaning solvent into the inner needle 303 and injecting a second solution or a cleaning solvent into the outer needle 304.

In the coaxial control dual nozzle described above, the hollow tube of the inner needle 303a is configured to have a smaller outer diameter than the inner diameter of the hollow tube of the outer needle 304a by 5 μm to 1000 μm. The coaxial dual nozzle configured using a dual tube including the inner needle 303a and the outer needle 304a is preferably configured to have 21G to 27G [21G (OD: 0.80 mm, ID: 0.50 mm), 27G (OD: 0.40 mm, ID: 0.20 mm) mm)], or 22G to 30G [22G (OD: 0.70 mm, ID: 0.40 mm), 30G (OD: 0.30 mm, ID: 0.15 mm)], or 23G to 32G [23G (OD: 0.63 mm, ID: 0.33 mm), 32G (OD: 0.25 mm, ID: 0.10 mm)], in the case of an ultrafine dual nozzle. At this time, the gap between the outer diameter of the hollow tube of the inner needle 303a and the inner diameter of the hollow tube of the outer needle 304a is preferably maintained as 5 μm to 100 μm. The dual nozzle for manufacturing a core-shell structure is preferably configured to have 17G to 23G [17G (OD: 1.47 mm, ID: 1.07 mm)], 23G (OD: 0.63 mm, ID: 0.33 mm)], or 17G to 25G [17G (OD: 1.47 mm, ID: 1.07 mm), 25G (OD: 0.50 mm, ID: 0.25 mm)], or 18G to 25G [18G (OD: 1.27 mm, ID: 0.85 mm), 25G (OD: 0.50 mm, ID: 0.25 mm)]. At this time, the gap between the outer diameter of the hollow tube of the inner needle and the inner diameter of the hollow tube of the outer needle is preferably maintained as 50 μm to 1,000 μm.

The coaxial control dual nozzle according to the present disclosure is used to manufacture a fibrous or particulate core-shell structure using an electrospinning or electrospraying process by applying a DC high voltage of tens of volts to hundreds of thousands of volts to the nozzle unit body. In addition, when manufacturing a double-layer structure having a core-shell structure, the above polymer solution is employed as a shell solution, and a core solution may be selected as a functional material such as oil. At this time, the functional material may be applied to a drug, a conductive material containing silver (Ag) or carbon-based particles, an antibacterial deodorant, a fragrance microcapsule, an electromagnetic wave shielding material, an ultraviolet curing material, oil, or the like.

In addition, the coaxial control dual nozzle according to the present disclosure may be used as an injection nozzle capable of producing ultrafine particles by injecting a solution into the inner nozzle and injecting air or gas into the outer nozzle part. In particular, uniform injection may be achieved by configuring the hollow tube needle coaxially.

In addition, the dual nozzle according to the present disclosure may be utilized for fabricating circuits with a fine line width.

The distance and concentricity between the central axes of the inner needle and the outer needle of the coaxial control dual nozzle according to the present disclosure may be measured by the following method. For example, in the case of a dual nozzle with 17G to 23G [17G (OD: 1.47 mm, ID: 1.07 mm), 23G (OD: 0.63 mm, ID: 0.33 mm)], for the concentricity of the inner needle, the dual nozzle is placed on a turning table, and center points of the core portion are recorded, respectively, while turning the table to measure a maximum distance among the locations of the center points. In addition, the concentric state of the inner needle and the outer needle is determined by measuring a distance D1 of a left side between the outer diameter of the inner needle and the inner diameter of the outer needle and a distance D2 of a right side between the outer diameter of the inner needle and the inner diameter of the outer needle. As a measuring microscope, a video microscope (Sometech Vision, Model SV32, Lens X100) may be used.

INDUSTRIAL APPLICABILITY

If the present disclosure is applied, the central axes of the inner needle and the outer needle may be precisely controlled coaxially, thereby producing a particulate and fibrous filament structure having a uniform core-shell dual structure.

What is claimed is:

1. A coaxial control dual nozzle, comprising:
   an inner nozzle body having an injection port through which a first fluid is injected;
   an inner needle connected to the inner nozzle body and having a hollow tube needle configured to provide a discharge port for the first fluid;
   an outer nozzle body assembled with the inner nozzle body and having an injection port through which a second fluid is injected;
   an outer needle connected to the outer nozzle body and disposed to surround the hollow tube needle provided to the inner needle, the outer needle having a hollow tube needle configured to provide a discharge port for the second fluid;
   an inner needle positioning unit configured to control a location of a central axis of the hollow tube needle provided to the inner needle; and
   an outer needle positioning unit configured to control a location of a central axis of the hollow tube needle provided to the outer needle.

2. The coaxial control dual nozzle according to claim 1, wherein the inner needle positioning unit has a metal plate in which a central hole into which the inner needle is inserted and a plurality of peripheral holes through which the second fluid injected into the outer nozzle passes are formed.

3. The coaxial control dual nozzle according to claim 2, wherein the metal plate is placed on a holder installed inside the outer nozzle body.

4. The coaxial control dual nozzle according to claim 1, wherein the outer needle positioning unit has at least one central axis adjusting screw pin disposed around the outer needle.

5. The coaxial control dual nozzle according to claim 4, wherein the screw pin has a diameter of 0.5 mm to 5 mm, and a tip of the screw pin has a sharp shape or a U shape to make contact with the hollow tube needle.

6. The coaxial control dual nozzle according to claim 1, further comprising:
   an inner needle fastening cap configured to attach and detach the inner needle to/from the inner nozzle body,
   wherein the inner needle fastening cap has a semicircular groove structure configured to be fastened to a hub provided to the inner needle or a Luer lock structure having a double screw thread formed therein.

7. The coaxial control dual nozzle according to claim 1, wherein the hollow tube needle provided to the inner nozzle and the outer nozzle has an inner diameter of 0.005 mm to 2 mm, an outer diameter of 0.02 mm to 3 mm, and a length of 2 mm to 200 mm.

8. The coaxial control dual nozzle according to claim 1, wherein a high voltage applying unit configured to apply a DC high voltage of 0.1 kV to 60 kV is connected to the inner nozzle body.

9. The coaxial control dual nozzle according to claim 1, wherein a gap between an outer diameter of the hollow tube of the inner needle and an inner diameter of the hollow tube of the outer needle is 5 μm to 1,000 μm.

10. A coaxial control dual nozzle, comprising:
    an inner nozzle body having an injection port through which a first fluid is injected;
    an inner needle connected to the inner nozzle body and having a hollow tube needle configured to provide a discharge port for the first fluid;

an outer nozzle body assembled with one end of the inner nozzle body and having an injection port through which a second fluid is injected;

an outer needle connected to the outer nozzle body and disposed to surround the hollow tube needle provided to the inner needle, the outer needle having a hollow tube needle configured to provide a discharge port for the second fluid;

an inner needle positioning unit configured to control a location of a central axis of the hollow tube needle provided to the inner needle;

an outer needle positioning unit configured to control a location of a central axis of the hollow tube needle provided to the outer needle;

a pneumatic controller body assembled with the other end of the inner nozzle body and having an injection port through which air is injected; and a needle shaft installed inside the pneumatic controller body and operated by the air to control or block the flow of a solution transported to the inner needle.

11. The coaxial control dual nozzle according to claim 10, wherein the needle shaft includes a taper blocking unit configured to block the injection port of the inner needle and a front tip needle configured to be inserted into the hollow tube needle of the inner needle.

12. The coaxial control dual nozzle according to claim 10, wherein the needle shaft is elastically biased upward by a spring to keep the inner needle in an opened state at ordinary times.

13. The coaxial control dual nozzle according to claim 12, wherein when air is injected into the pneumatic controller body, the taper blocking unit of the needle shaft blocks the injection port of the inner needle, and the front tip needle is inserted into the hollow tube needle of the inner needle so that an end portion thereof protrudes out of the tip.

14. The coaxial control dual nozzle according to claim 10, further comprising:

a needle shaft sealing unit coupled to the needle shaft inside the inner nozzle body to prevent the first fluid from leaking above the inner needle.

\* \* \* \* \*